E. D. FERGERSON.
HARROW.
APPLICATION FILED MAR. 5, 1913.

1,069,242.

Patented Aug. 5, 1913.
2 SHEETS—SHEET 1.

Witnesses

Edward D. Fergerson, Inventor,
by C. A. Snow & Co.
Attorneys.

E. D. FERGERSON.
HARROW.
APPLICATION FILED MAR. 5, 1913.
1,069,242.
Patented Aug. 5, 1913.
2 SHEETS—SHEET 2.
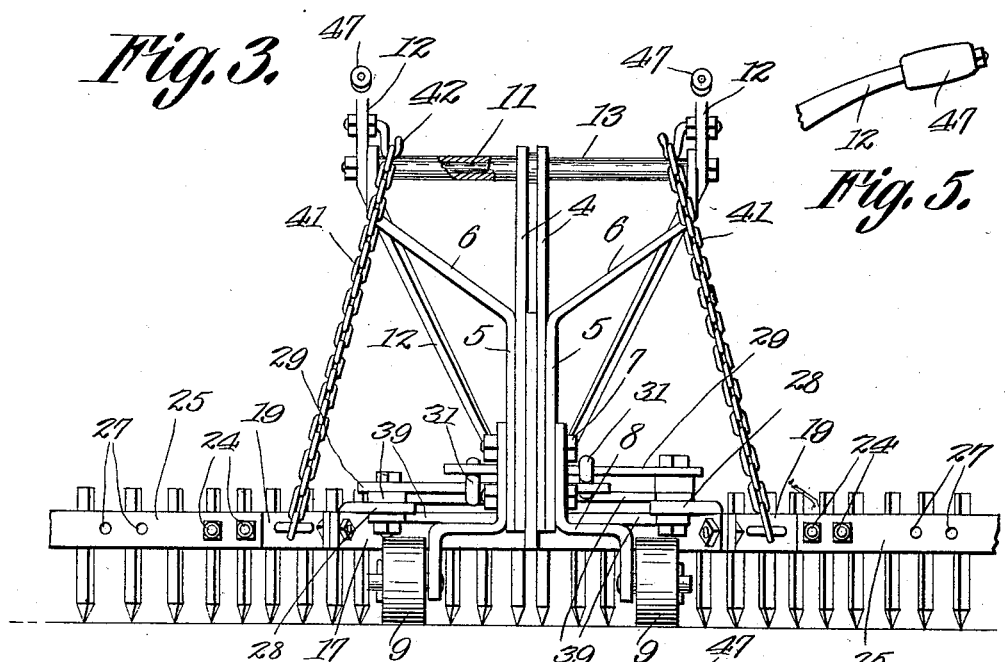
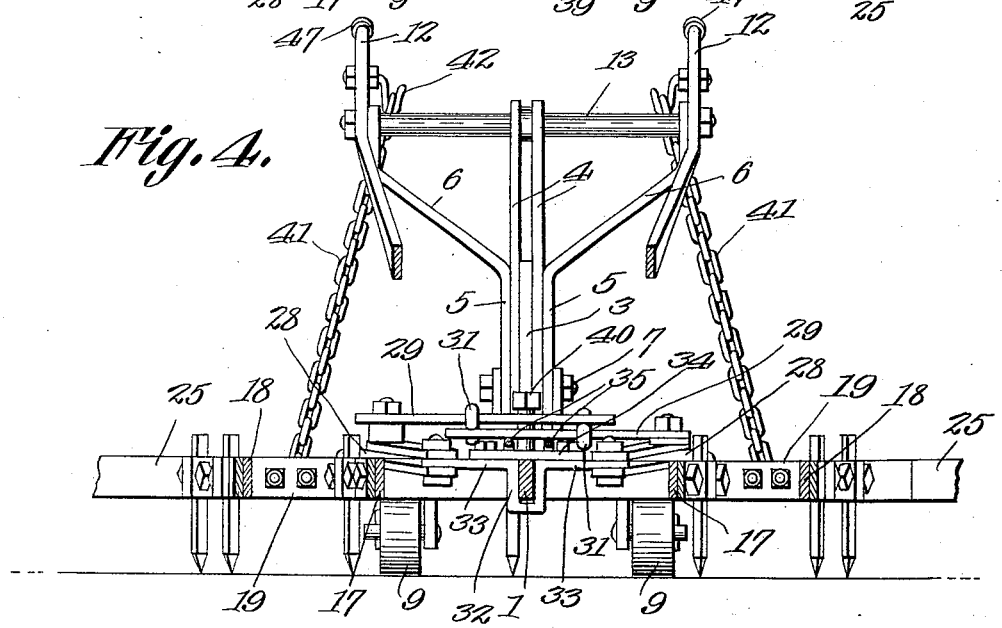
Edward D. Fergerson
Inventor,
Witnesses
by C. A. Snow & Co.
Attorneys.

UNITED STATES PATENT OFFICE.

EDWARD D. FERGERSON, OF CHATTANOOGA, TENNESSEE.

HARROW.

1,069,242.  Specification of Letters Patent.  Patented Aug. 5, 1913.

Application filed March 5, 1913. Serial No. 752,223.

*To all whom it may concern:*

Be it known that I, EDWARD D. FERGERSON, a citizen of the United States, residing at Chattanooga, in the county of Hamilton and State of Tennessee, have invented a new and useful Harrow, of which the following is a specification.

This invention relates to harrows and is more particularly an improvement upon the structure disclosed in Patent No. 1,018,103, issued to me on February 20, 1912.

One of the objects of the invention is to provide a harrow having detachable sections whereby said harrow can be built up or reduced to any desired size, the said sections being grouped at opposite sides of a central beam and being adjustable angularly relative to each other so as to travel along a path of any desired width.

Another object is to provide an improved connection between the two groups or sections of the harrow, said sections being shiftable to vary the width of the harrow and having means whereby the connection can be locked after the harrow sections have been adjusted to any desired positions relative to each other.

A further object is to provide improved means for adjusting the harrow toward or from the ground.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
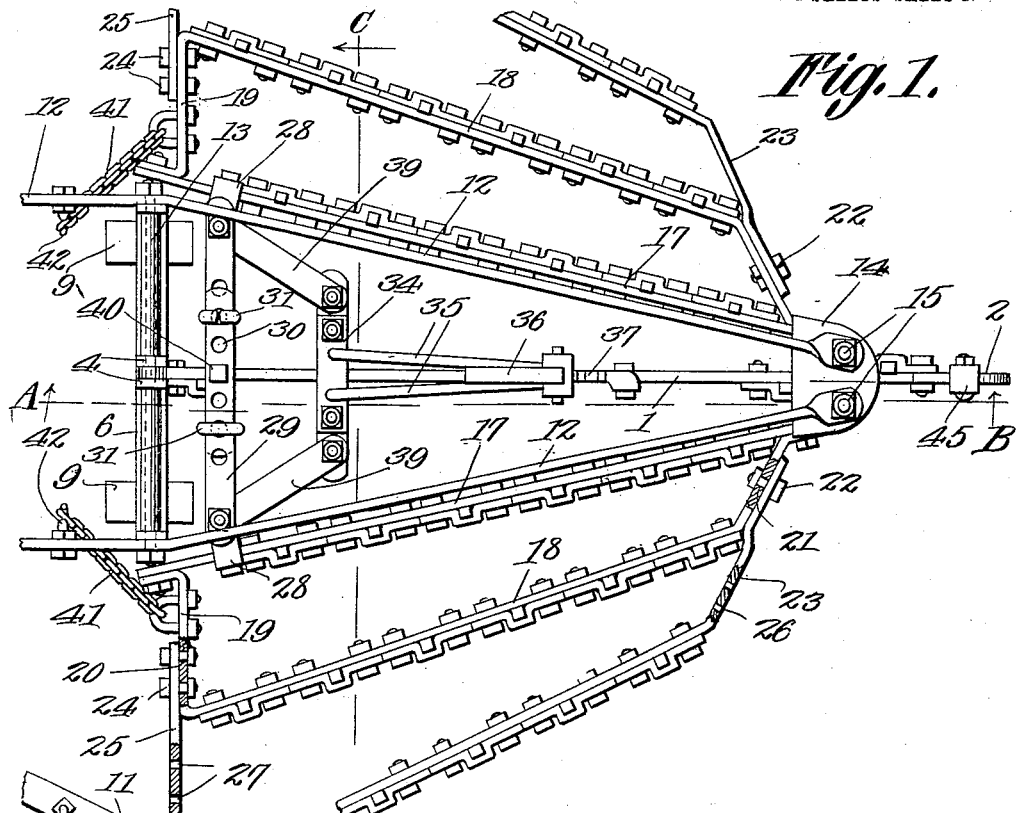
Figure 2:
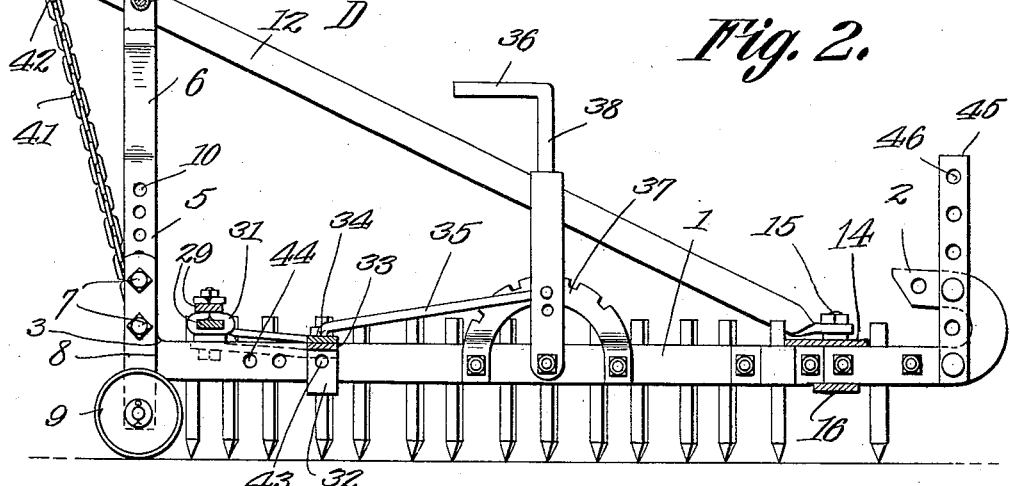

In said drawings:—Figure 1 is a plan view of the harrow, portions thereof being shown in section and parts of the outer bars of the sections being removed. Fig. 2 is a section on line A—B Fig. 1. Fig. 3 is a rear elevation. Fig. 4 is a section on line C—D Fig. 1. Fig. 5 is a side elevation of a part of one of the handles.

Referring to the figures by characters of reference 1 designates the central beam having a clevis 2 at its front end while its rear end portion is upturned to form a standard 3. Arranged at opposite sides of this standard 3 are parallel upwardly extending strips 4 and arranged upon the outer sides of these strips are the lower parallel portions 5 of braces 6. Bolts 7 extend transversely through openings formed in these parallel portions 5, the strips 4 and the standard 3 and also extend through angular brackets 8 which extend downwardly and have supporting wheels 9 journaled upon the lower end portions thereof. By providing a series of apertures within the standards 3, strips 4 and parallel portions 5, these apertures being shown at 10, the brackets 8 can be adjusted upwardly or downwardly so as thus to shift the wheels 9 relative to the beam 1 and hold the harrow teeth, hereinafter described, at any desired distance from the surface of the ground.

The strips 4 and braces 6 support a cross rod 11 engaging handles 12, there being spacing sleeves 13 upon the rod and between the strips 4 and the braces 6. Handles 12 are inclined downwardly and forwardly and are secured, at their front ends, upon a plate 14 suitably secured upon the beam 1. The bolt 15 used for connecting the handles to the plate 14 also serves to connect said plate to a bottom plate 16 arranged under beam 1. These bolts 15 constitute the pivots for the front ends of bars 17 which are straight from end to end and are connected with angular bars 18 which are provided at their back ends with inwardly extending terminal portions 19 secured to the bars 17 and constituting means for holding the bars 17 and 18 spaced apart at their rear ends. Openings 20 are formed in the inwardly extending terminal portions 19 and another opening 21 is formed in the front portion of each bar 18. The openings 21 are adapted to receive bolts or the like such as shown at 22 and which serve to detachably secure additional angular bars 23 to the bars 18. The rear openings 20 receive bolts 24 or other suitable fastening means for securing to the portions 19, the inwardly directed rear terminal portions 25 of the angular bars 23. These bars 23 are, in turn, provided with apertures 26 and 27 at their front and rear ends to which additional angular bars may be connected. Thus it will be seen that the harrow can be made up of any suitable number of bars which may be detachably secured together in the manner described.

It is to be understood that each of the bars 17, 18 and 23 is to be provided with any suitable arrangement of harrow teeth, the arrangement being preferably that described and illustrated in my patent hereinbefore referred to. Furthermore it is to be understood that the bars 17, 18 and 23 as well as the beam 1 can be made of wood or any other material desired although in actual practice it has been found most desirable to form these parts of metal.

Secured to each of the bars 17 at its rear end is a bracket 28 which bracket is pivotally connected to a link 29 formed of a flat strip of metal having a plurality of openings 30 therein. These links 29 are arranged one above the other and are held together by collars 31. One of these collars is secured to each link and extends loosely around the other link. Thus it will be seen that the two links can be shifted longitudinally relative to each other. A U-shaped slide 32 is mounted on the beam 1 and has laterally extending wings 33 to which a top plate 34 is secured. This top plate rests on and is slidable upon the beam 1 and has rods 35 extending forwardly from it to a lever 36 which is fulcrumed on the beam 1 and is provided with any suitable means, such as a toothed segment 37 and a plunger 38, for locking the lever in any position to which it may be adjusted. Links 39 are pivotally connected to the wings 33 and also to the brackets 28 and it is to be understood that, by shifting the slide 32 rearwardly, these links 39 will act as a toggle and slide the links 29 outwardly relative to each other so as thus to move the bars 17 away from beam 1. By pulling slide 32 forwardly, however, this movement is reversed, bars 17 being swung inwardly toward the beam 1. When the bars 17 are in any of the positions to which they may be adjusted, a bolt 40 or the like may be inserted through two registering openings in the slides 29 so as thus to hold the slides against relative movement.

Chains 41 may be connected to the inwardly extending portions 19 of bars 18, these chains extending upwardly and being detachably connected to hooks 42 extending inwardly from the handles 12. These chains and hooks thus serve to support the laterally extending portions of the harrow so that they will not sag to an undesirable extent.

It will be noted that the U-shaped slide 32 has a transverse opening 43. This opening is adapted to register with any one of a series of openings 44 formed within the beam 1 and by inserting a locking pin through opening 43 and any one of the openings 44 with which it may be registering, it will be seen that the slide can be locked against movement along the beam 1.

It will be obvious that by manipulating lever 36 the two movable sections of the harrow can be readily shifted relative to each other and, after thus being shifted, they can be locked against relative movement by placing pin 40 in position and by inserting a pin through the opening 43.

Should it be desired to decrease the normal width of the harrow, the angular bars or units 23—18 can be removed. Thus the harrow can be pulled by one horse. By adding the bars or units 23—18 it will be necessary to use two or more horses to pull the harrow.

By referring particularly to Fig. 2, it will be seen that the clevis 2 has an upstanding yoke 45 connected thereto and provided with a series of apertures 46 any one of which is adapted to receive a hook or the like whereby the draft animals may be connected to the clevis. By providing this vertical series of apertures 45, the pull upon the harrow can be so regulated as to cause the teeth to cut into the soil any desired distance.

As shown in Figs. 3, 4 and 5, grips 47 of wood or the like may be connected to the rear end of handles 12 to protect the hands of the user from heat and cold.

What is claimed is:—

1. In a harrow the combination with a central beam, of side bars pivotally connected thereto and diverging rearwardly therefrom, means for adjusting said bars toward or from each other, and a plurality of interfitting detachably connected angular bars detachably secured to the inner side bars, and harrow teeth carried by each of the bars.

2. A harrow including a central beam, a standard at the rear end thereof, brackets adjustable vertically relative to the standard, supporting wheels journaled on the brackets, side bars mounted to swing relative to the beam, means for adjusting said bars angularly relative to the beam, interfitting detachably connected angular beams movable with said side bars, and harrow teeth carried by the respective beams.

3. A harrow including a central beam, a standard at the rear end thereof, brackets adjustable vertically relative to the standard, supporting wheels journaled on the brackets, side bars mounted to swing relative to the beam, means for adjusting said bars angularly relative to the beam, interfitting detachably connected angular beams movable with said side bars, harrow teeth carried by the respective beams, and means for locking the bars in any positions to which they may be adjusted.

4. In a harrow the combination with a tooth carrying side bar, of a unit for detachably engaging said side bar and including a tooth carrying bar having an inwardly extending rear terminal portion for attachment to the side bar and a forwardly and inwardly inclined front terminal portion for attachment to said side bar, said terminal portion having apertures for the reception of means for fastening another unit thereto.

In testimony that I claim the foregoing as my own, I have hereto affixed my signature in the presence of two witnesses.

EDWARD D. $\underset{\text{mark}}{\overset{\text{his}}{\times}}$ FERGERSON.

Witnesses:
  H. W. SCHOOLFIELD,
  W. A. SCHOOLFIELD.

Copies of this patent may be obtained for five cents each, by addressing the "Commissioner of Patents, Washington, D. C."